3,184,660
CERAMIC CAPACITOR
Preston Robinson, Williamstown, Mass., assignor to Sprague Electric Company, North Adams, Mass., a corporation of Massachusetts
Filed Aug. 22, 1961, Ser. No. 133,097
1 Claim. (Cl. 317—258)

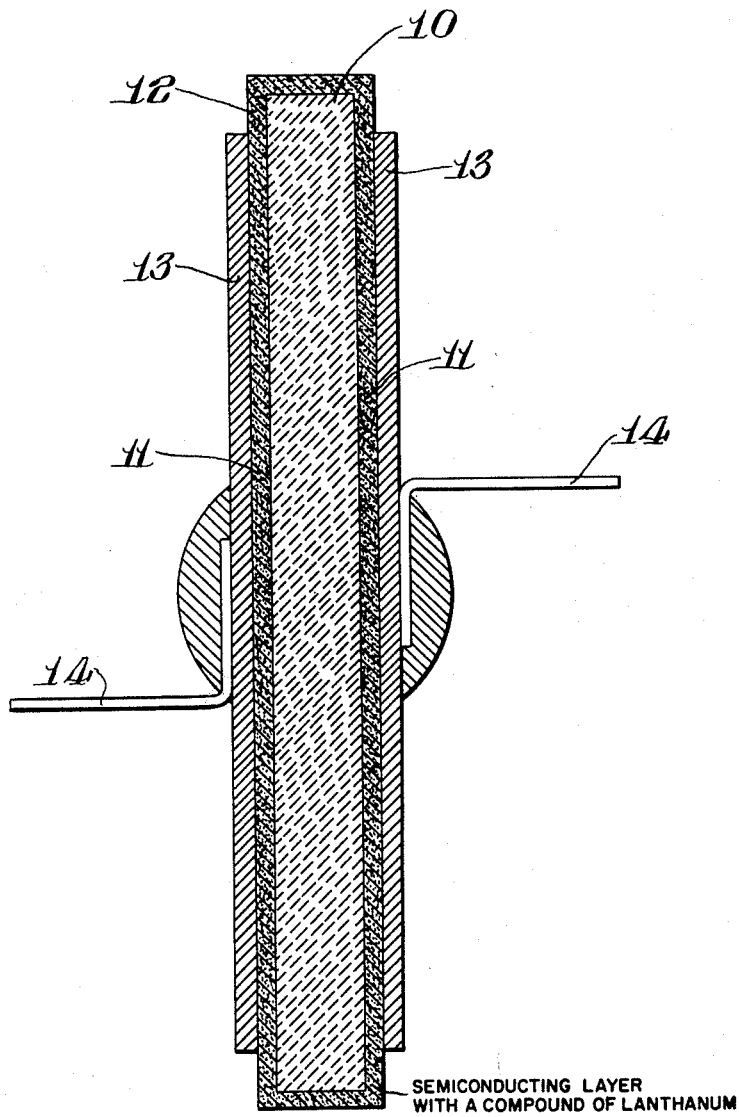

This application is a continuation-in-part of my copending application Serial No. 684,516 filed September 17, 1957, now Patent No. 2,997,635, for Ceramic Capacitors.

The present invention relates to ceramic dielectric material and more particularly to a ceramic dielectric material for capacitors and to capacitors composed of new ceramic dielectric material.

Ceramic dielectric materials are of value as the dielectric material of electrical capacitors. Capacitors are made of a thin sheet of such material with electrodes diametrically positioned on surfaces thereof. In the past, however, it has been found that ceramic dielectrics in capacitors are subject to degradation during use which eventually deprives the material of its superior characteristics and leads to the failure of the capacitor. It is considered desirable to have a ceramic dielectric which includes a layer of ceramic material containing a different make-up than the portion of the dielectric which provides the dielectric properties. This layer among other things can serve to ameliorate the degradation of the ceramic.

It is an object of this invention to provide a ceramic dielectric having a portion which is constituted to provide a thin layer constituted differently from the remainder of the ceramic material to provide a modified ceramic dielectric for ceramic capacitors.

It is another object of this invention to provide a ceramic dielectric having a surface portion which is constituted differently than the remainder of the ceramic material.

It is still another object of this invention to provide modified characteristics to ceramic capacitor dielectrics of the titanate, niobate, tantalate types during use in capacitors.

These and other objects of this invention will become more apparent upon consideration of the following description taken together with the accompanying drawing in which:

The figure is a diametral cross-section of a circular ceramic capacitor embodying this invention.

According to the present invention ceramic dielectrics are provided with a layer of a ceramic material having as a constituent a material which provides conductivity to the layer. This applies particularly to the titanates, niobates, and tantalates. The layer has a sufficient quantity of the constituent to be in the category of a semiconductor. Associated with this layer in the ceramic material is a zone of a conductivity which provides dielectric properties to the ceramic material.

Ceramic dielectrics, which have been found to be particularly effective in accordance with the present invention, are commercial barium titanate ceramic bodies such as those containing an excess of titanium oxide in a minor amount. The ceramic composition of a mixture of ingredients and with a binder such as paraffin is pressed and fired at a temperature in the range of 2300° to 2600° F. A suitable ceramic dielectric is thereby produced having temperature coefficient, dielectric constant, power factor and aging characteristics meeting commercial requirements. In this invention the ceramic dielectric material has combined in it a constituent which provides conductivity. The dielectric constant of the base ceramic dielectric material is greater than 1000 and the material is particularly useful in ceramic capacitors. One such commercial ceramic may be a barium calcium titanate zirconate. This commercial body need not contain the elements in stoichiometric proportions but may contain an excess of some of the components.

According to this invention a ceramic dielectric body made up of a alkaline earth titanate type, alkaline earth niobate type, the alkaline earth tantalate type, or bismuth titanate has a layer at its surface in which there is a compound which is capable of providing conductivity to the ceramic material in the layer. The material has dielectric properties. The body of this invention provides a body which can be made into a capacitor. The conductivity provided by the layer cooperates to produce the characteristics of the resultant capacitor.

Various compounds incorporated in the layer of the ceramic material will provide this conductivity to the ceramic material. For example, bismuth nitrate and niobium salts will provide conductivity to the layer when applied to the surface of the ceramic material so as to form the layer. Other compounds adaptable to producing this layer are vanadyl acetate, tantalum pentoxide, osmium oxide and uranium acetate. Other suitable compounds are niobium pentoxide and lanthanum trioxide. These constituents are introduced into the base ceramic material to make up the conductive layer by any suitable means. For example, in the barium type ceramic there may be doping with an appropriate quantity of niobium pentoxide or lanthanum trioxide by well known procedures to have a conductivity with resistivity values at 25° C. of the order of 10–1000 ohms centimeters. In addition, to lanthanum and niobium compounds, gallium and indium compounds may be used as dopants. In a broader sense, the dopants from the first and third columns of the periodic table may be useful.

In an embodiment of this invention, this constituent may be present as an impregnation in a surface layer of the ceramic material. In such a case the application of the constituent to a ceramic body of the barium titanate type may be applied to more than just one surface. A constituent of the metal element of the constituent in the proportion of 0.25% of the ceramic composition by weight is a suitable concentration. For example, with a barrier compound such as uranium acetate the concentration of the metal of the barrier compound should not exceed about 1% of the ceramic composition by weight. It is proposed that one application of the barrier compound might be achieved by the incorporation into the ceramic body from the surface of a suitable barrier compound. This incorporation would vary in percentage of concentration of the metal progressively inwardly from the surface with the highest concentration at the surface. Thus, it would be possible to produce a distribution of barrier compound in the ceramic body which would present a maximum concentration of the metal at or on the ceramic body surface with a progressive decrease of the relative percentage to zero. There would thus be provided a preferred percentage of barrier compound in the zone of the incorporation.

The barrier compound is applied to the ceramic body by suitable means to provide a distribution, incorporation and surfacing of the barrier compound on or in the ceramic body. It is preferred that the application be effected by an in-diffusion method. As indicated above, this in-diffusion will result in a desirable gradation of concentration and a more certain attainment of the optimum ratio of metal of ceramic composition. The indiffusing may be achieved by suitable methods to provide the proper percentage of barrier. Also the barrier compound may be evaporated on the ceramic body or applied by spraying. Any method which avoids the production of conductive glaze on the body surface will produce a zone of the barrier compound across the ceramic composition in a proper concentration, for example, 0.25% by weight of ceramic composition having a width of 0.001 inch will be satisfactory. The application of a substance from which a barrier compound can be attained could be applied to the surface and decomposed by the firing temperature of silver anode electrode to produce the barrier compound which is received by the ceramic body. In effect the in-diffusion method encompasses any introduction and soaking in of the barrier compound.

In addition to the barium titanate type described above, there are other ceramic dielectrics which produce capacitor bodies according to this invention. Sodium metaniobate ($NaNiO_3$), potassium metaniobate ($KNiO_3$), sodium tantalate ($NaTaO_3$), potassium tantalate ($KTaO_3$) and lithium tantalate ($LiTaO_3$) are representative. Another is bismuth titanate of the general formula

$$(Bi_2O_2)\ A_{x-1}Ti_xO_{3x+1})$$

where $x$ is 2, 3 or 4, and A can be a variety of ions provided they fit and have the correct valences.

The introduction of niobium into one of these materials such as the sodium metaniobate produces $Na_2NbO_5$ in the ceramic. This is a layer having a conductivity provided by the constituent according to this invention.

In a modification of this invention, a body of the above mentioned types may be prepared into a modified capacitor body by first introducing into the body a constituent such as sodium, lanthanum, or boron in a suitable concentration for preparing the body. For example, a sodium constituent in the proportion of 2% of the ceramic composition by weight is a suitable concentration. Similarly a constituent of boron in the proportion of 0.50% of the ceramic composition by weight is a suitable concentration. Similarly a concentration of 0.50% of lanthanum makes a suitable body. With the body thus prepared a dopant from the fifth group is diffused into the body to provide a portion with different conductivity characteristics. Between the layer provided by the niobium compound dopant and the area of the sodium, lanthanum, or boron types there is provided a neutral zone. This neutral zone is very thin and has dielectric properties which make the body particularly good for a capacitor.

The results of this invention may be also obtained by a coating on the ceramic body. This coating may be applied to the ceramic dielectric body after the body has been fired so as to form thereon a distinct surface coating covering the surface of the ceramic body. This application may be effected in any suitable manner such as a dip in a molten coating bath at an elevated temperature below the fusion point of the ceramic dielectric and subsequently cooling the body to room temperature thereby solidifying the coating. The coating may be also applied from aqueous or non-aqueous solution or colloidal suspension followed by drying with or without fusion to a coherent solid state.

A particularly convenient technique for applying the coatings is by dipping the dielectric in an aqueous solution that deposits the desired material upon drying. Ammonium metavanadate in a 0.5% solution in water will, for example, after a dip and a one-minute firing at 500° C. in air, form a vanadium pentoxide layer less than 0.01 mil thick. For best results the dipping and firing are repeated five or six times, to build up the coating thickness to about 0.05 mil. The final product can then have silver electrodes applied in the standard manner, firing a silver paste on as described in National Bureau of Standards, Circular 468, page 7, issued on November 15, 1957, entitled Printed Circuit Techniques, and will then show the unusual long life of the present invention. The effect is most pronounced when the dielectric is used at temperatures above 85° C., where prior art ceramics show relatively short lives.

In addition to the compounds mentioned above certain of the salts of chromic acid may be applied to the ceramic dielectric body. The chromate salts are less useful than some of the above-noted compounds because of their solubility or partial solubility. Zinc chromate, however, does not suffer this disability and is therefore one of the more available compounds. Also available as coating compounds but more restricted in range of application are copper chromate, barium chromate and the soluble salts, stannic chromate, calcium chromate and silver chromate. Another suitable compound is platinum oxide as well as heavy metal platinate.

The chromate salts set forth above provide examples of compounds requiring a variety of methods of application to the ceramic body for the formation of the barrier of this invention. For example, zinc chromate, an aqueous insoluble salt, is soluble in acids and may be applied from an aqueous solution. A further variation is presented in the application of osmium oxide which is soluble in alkalies and decomposes before melting and is best applied from an alkaline solution.

A suitable compound for application as a coating on the ceramic dielectric is vanadic pentoxide. Vanadic pentoxide powder heated to the melting point and applied to the ceramic body by a suitable method such as dipping will produce a thin coating of vanadic pentoxide on the ceramic dielectric body upon cooling.

The barrier compound may be present on or in the ceramic body either as a superficial coating on the surface or an impregnation of the surface layer. The application of this barrier compound in the anode area is of principal importance. However, it should be applied to a greater extent than the actual area of the anode electrode. Therefore, the surface of the ceramic body immediately adjacent to the anode electrode area receives the barrier compound with advantage. The other surfaces of the ceramic body can receive the barrier compound to produce an effect of this invention.

Referring to the figure a ceramic disc 10 composed of a ceramic of the type of this invention is shown having a layer 11 of a ceramic containing a constituent providing conductivity to the ceramic. On each of the lateral surfaces 12 of layer 11 on disc 10 is applied an electrode 13. The electrodes 13 each are provided with a suitably attached lead 14. The electrodes 13 may be composed of a layer of silver mixed with 2% lead silicate binder and/or other suitable electrode material. The electrode material is screen printed on disc 10 over the coating 11 or otherwise suitably applied.

The layer 11 extends across ceramic disc 10 so as to underlie the electrodes 13 and cover the area of the ceramic disc 10 adjacent to the electrodes 13. The electrodes do not cover all of the surfaces 11. However, the layer 11 is made up so as to be primarily present in the vicinity of the electrodes. The application of the layer in the anode area is of principal importance. Therefore, the surface of the ceramic body immediately adjacent to the anode electrode area receives the layer with advantage. The other surfaces of the ceramic body can similarly receive the modifying constituent to produce an effect of this invention.

This invention provides a ceramic capacitor made up of a material which has longer life and greater thermal stability than a similar capacitor which does not have the coating of this invention.

In-diffusion and doping as used herein refer to the treatment with a compound of a type and quantity which when added to the ceramic in controlled amounts alters the conductivity and yields the specific resistivity desired.

While the above description contains illustrations of the invention, it will be understood that further modifications are possible.

Since certain changes may be made in the above-described embodiments, the various embodiments are set forth for the purpose of illustration only and it will be understood that it is intended that the scope be limited only by the appended claim.

What is claimed is:

A ceramic capacitor comprising a dielectric body composed of a ceramic material selected from the group consisting of an alkaline earth titanate, an alkaline earth niobate, an alkaline earth tantalate and bismuth titanate, a surface of said body having a semiconducting layer integral with said ceramic material, a constituent of said layer being a compound of lanthanum; and an electrode covering less than the full area of the surface of the layer.

References Cited by the Examiner

UNITED STATES PATENTS

| | | | |
|---|---|---|---|
| 2,520,376 | 8/50 | Roup et al. | 317—258 |
| 2,689,805 | 9/54 | Croze | 117—65 |
| 2,758,267 | 8/56 | Short | 317—242 |
| 2,759,854 | 8/56 | Kilby | 117—217 |
| 2,841,508 | 7/58 | Roup | 317—258 |
| 2,964,413 | 12/60 | Merker | 106—39 |
| 2,997,635 | 8/61 | Robinson | 317—258 |

FOREIGN PATENTS

| | | |
|---|---|---|
| 22,223 | 4/36 | Australia. |
| 844,707 | 8/60 | Great Britain. |

JOHN F. BURNS, *Primary Examiner.*

E. JAMES SAX, *Examiner.*